Figure 1:
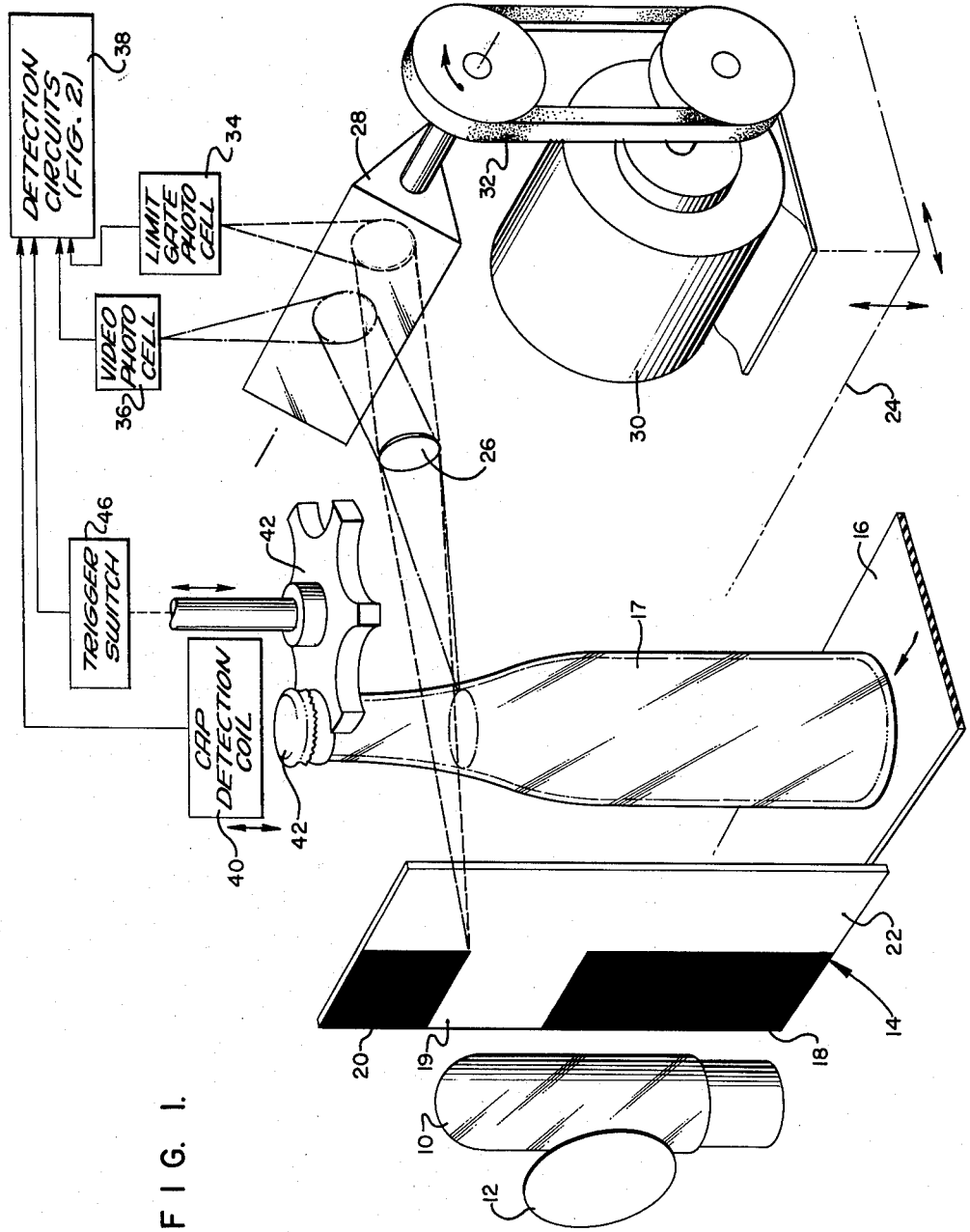

3,094,214
AUTOMATIC CONTAINER FILL-HEIGHT
INSPECTION MACHINE
James H. Wyman, San Pedro, and Robert G. Husome, Manhattan Beach, Calif., assignors to Industrial Automation Corp., El Segundo, Calif., a corporation of California
Filed May 5, 1961, Ser. No. 108,002
8 Claims. (Cl. 209—111.5)

This invention relates to automatic fill-height inspection machines and, more particularly, to an improved arrangement for determining that a translucent container has been filled to the proper level.

Presently known automatic fill-height machines for photoelectrically inspecting a translucent container are not completely reliable, as a result of difficulties experienced with different colored bottles or bottles of varying opacity, thickness, or even in view of the fact that some liquids which are carbonated, such as beer, will have a foam at the top of the liquid which can provide a false signal as to the actual level to which the container is filled. Another difficulty which arises is that the prior systems are substantially limited to use with only one size of a container. If a production run of a different container size or even different fill-height requirements is desired, a considerable realignment of the fill-height inspection apparatus parameters is required. A further limitation of prior systems is that they may be applicable only to translucent liquids.

An object of this invention is the provision of a reliable fill-height inspection apparatus.

Another object of this invention is the provision of a novel and useful fill-height inspection apparatus.

Yet another object of this invention is the provision of a fill-height inspection apparatus which is easily adjustable for inspecting containers of different sizes.

Yet another object of this invention is to provide fill-height inspection capability for opaque liquids, translucent liquids with foam on top, or solid (e.g., granular or powdered) materials in translucent containers.

These and other objects of the invention may be achieved in a fill-height inspection system wherein artificial fill limits representing the desired limits are established adjacent to the location at which a container fill level is inspected. Light is employed to illuminate the fill-height limits, as well as the container, and, by means of a light-projection system and photocells, a comparison is made to determine whether the height of the interface between the top of the liquid (or solid) and the air within the container falls within the limits established by the fill-height limit-setting device. If the height of the contents of the container is within such limits, then the bottle is passed, and, if not, it is rejected. In addition, while the container is being inspected for fill-height, there is provided an arrangement for determining whether or not the container has been capped.

Figure 2:
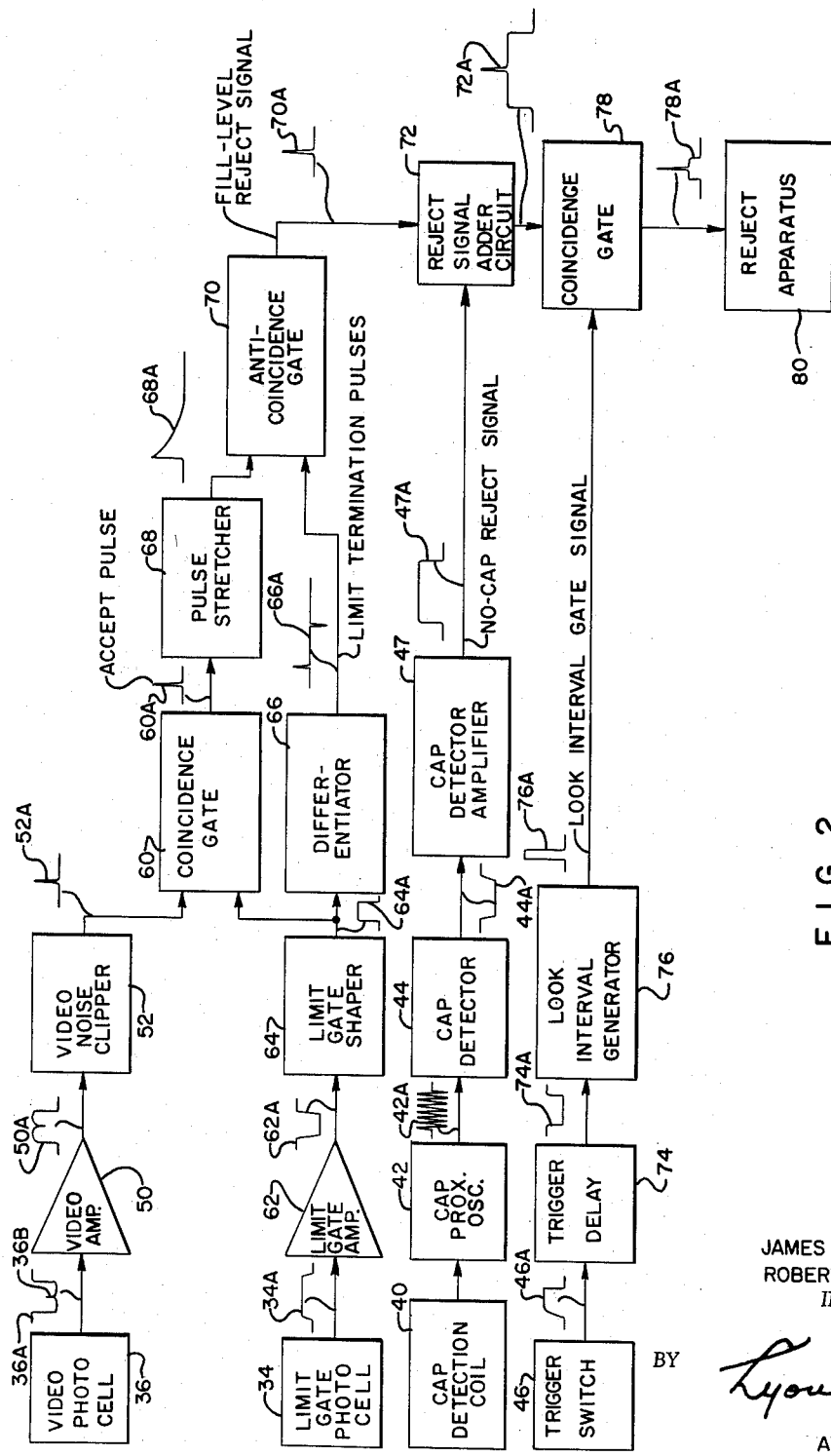

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 shows an arrangement of the mechanical and optical apparatus required in accordance with this invention for inspecting the fill height of a translucent container; and FIGURE 2 is a block schematic diagram of the circuits required in accordance with this invention for detecting whether or not the container has been filled to the proper level and, also, whether it is properly capped.

FIGURE 1 shows the mechanical and optical apparatus required in accordance with this invention for inspecting a translucent container to determine whether or not it has been filled to a predetermined level. Not shown in FIGURE 1 is the requisite apparatus for automatically handling such container—that is, the apparatus which brings the container to the inspection zone from the conveyor line and thereafter returns the container to the conveyor line or to a reject location, depending upon the results of the inspection. This apparatus is well known—see, for example, Patent No. 2,800,226. In accordance with this invention for the purpose of properly inspecting the fill-height of the container, there is provided a light source 10, behind which there is a reflector 12 to cause the light to be directed upon an opal glass light diffuser 14. This glass is positioned adjacent a conveyor belt 16, which transports the container 17 through the inspection zone.

The opal glass is positioned at one side of the inspection zone. Two areas at one side of the opal glass, respectively 18, 20, are rendered opaque by any suitable means. As shown, these areas extend only partially along the opal glass width dimension—that is, in the direction parallel to which the container is being conveyed. Thus, there is a region 22 of the opal glass which is translucent and serves to uniformly diffuse the light passing therethrough, and, thereafter, there is an adjacent region 18, which is opaque and which extends from the bottom of the opal glass upward until it attains the height indicative of the predetermined lower fill limit of the contents of the container. Thereafter, there is another translucent region 19, representative of the acceptable fill limits for the container. Thereafter, there is another opaque region which commences at the upper fill limit to which the container should be filled to be acceptable.

On the other side of the inspection zone is a housing 24, which is capable of being adjusted in position both vertically and horizontally. This housing contains an objective lens 26, which serves to direct light rays from two regions at two locations upon a multisided mirror 28. The objective lens may be supported in position by any well-known means, such as a bracket, extending from the wall of the housing 24.

In addition to determining the fill height of the container contents, there is also provided an arrangement for determining whether or not the container has been capped. This includes a cap-detection coil 40, which is held above the inspection zone at a position to be in proximity to the cap 42, which should be on each bottle or container as it passes therethrough. The output of the cap-detection coil is applied to the detection circuits 38.

In addition to the cap-detection arrangement, there is also provided apparatus for instructing the detection circuits 38 when the bottle 17 is at the proper location for being inspected. This includes a star wheel 44, which is engaged by the neck of each bottle as it is moved into the inspection zone by the conveyor 16. The star wheel is rotatably mounted, and, as the bottle moves, it rotates the star wheel, whereby a trigger switch 46 is actuated as the bottle passes in and out of the proper location for being inspected. The output of the trigger switch is connected to the detection circuits 38 for instructing them as to the proper interval for functioning in response to the signals from both photocells and the cap-detection coil. This multisided mirror is rotatably mounted and driven by a drive motor 30 through a belt 32 to rotate and thus provide a scanning type of action in the fill-height inspection apparatus. One of the regions directed by the objective lens 26 upon the multisided mirror 28 extends from the lower fill limit of the mask 18 of the opal glass, through the translucent area representing the acceptable region, into the upper fill-limit mask area 20. The image of this region is effectively moved by the rotation of the multisided mirror past a limit-gate photocell 30. Thus, effectively, a scanning of this region occurs at the photocell.

When a container reaches the position adjacent the opal glass 14, which is illuminated, the region of the container which includes the location of a proper fill height is directed by the objective lens 26 upon the multisided mirror 28, which moves the image past a video photocell 36, thereby effectuating a scanning action of the region. The outputs of the limit-gate photocell and the video photocell are applied to detection circuits 38, the details of which are shown in FIGURE 2.

Reference is now made to FIGURE 2, which is a block schematic diagram of the detection circuits 38 shown in FIGURE 1. There is shown adjacent each one of the rectangles representative of circuitry a wave shape which is indicative of the output signal from that circuit which may occur in the course of the inspection of a container for the proper fill height. Thus, in response to the light image of the desired fill region of the container which is imaged thereon by the multisided mirror, the video photocell 36 provides an output signal having a wave shape 36A, shown adjacent thereto. This wave shape 36A represents the output of the video photocell when the interface between the liquid and air, or liquid and foam, within the bottle occurs within the region scanned as a result of the rotation of the multisided mirror.

When light from the mirror does not reach the video photocell, its output signal has a first, or what may be considered as a dark, level. When light reflected from the mirror does reach the video photocell, its output alters to a second, or bright, level. If the liquid interface exists within the region scanned by the mirror, then there will occur an alteration in the wave shape 36A, represented by the notch 36B in that wave shape. This notch is caused by the reduction in the light that can pass through the container as a result of the presence of the interface. A high-intensity light is used, and, regardless of the color of the bottle being inspected or of the presence of foam, the interface region causes a distinct notch or drop in the output of the video cell 36. Obviously, if the fill height of the liquid in the container is below or above an acceptable level, there is no notch within the output signal of the video cell.

The output of the video cell is amplified and inverted by a video amplifier 50. The wave shape 50A constitutes an amplified and inverted replica of the wave shape 36A. The video-amplifier output is applied to a video noise-clipper circuit 52. This circuit eliminates all portions of the signal 50A except the notched portion. The output of the video noise-clipper circuit 52 is represented by the wave shape 52A. The video noise-clipper circuit 52 is a well-known type of circuit which is biased so that it responds only to signals which exceed a certain predetermined level. The only portion of the wave shape 50A which, as a result, will be passed and amplified by the video noise-clipper circuit is the "notch" portion.

The output of the video noise-clipper circuit 52 is applied to one input of a two-input coincidence gate 60. The coincidence gate 60 constitutes well-known circuitry which will provide an output signal only in the simultaneous presence of an input signal at each one of its inputs.

The output signal of the limit-gate photocell, in response to the signal reflected thereon by the multisided mirror, effectively constitutes a pulse signal commencing when the mirror shines the image of the edge of the lower fill limit on the photocell and terminating when the mirror shines the edge of the upper fill limit on the photocell. This pulse signal, represented by the wave shape 34A, is applied to a limit-gate amplifier 62. The output, consisting of a wave shape 62A is an inverted and amplified replica of the wave shape 34A. The output of the limit-gate amplifier 36 is applied to a limit-gate shaper 62. The function of this circuit is really to "square," or render more rectangular, the signal applied to its input. This shaper circuit constitutes well-known circuitry, such as an overdriven-amplifier circuit, or a Schmitt trigger circuit, either of which can perform the function of providing an output wave shape which is substantially more rectangular than the input signal.

The output of the limit-gate shaper circuit represented by the wave shape 64A is applied to both the coincidence gate 60 and to a differentiator circuit 66. The function of the differentiator circuit is well known—that is, to provide an output signal 66A, consisting of a spike signal at the leading edge and another spike signal at the trailing edge of the input pulse signal.

The output of the coincidence gate 60, consisting of the accept pluse 60A, is applied to a pluse-stretcher network 68. The pluse-stretcher network 68, which may comprise any well-known capacitor charge and discharge network, lengthens or stretches the input pulse to have a wave shape 68A. It is applied to one input of an anticoincidence gate 70, to the second input of which there is also applied the output of the differentiator circuit 66. The anticoincidence gate 70 comprises well-known circuitry which can sense the presence of a negative-going signal such as the pip derived from the trailing edge of the pulse input to the differentiating circuit which is not canceled by the output of the pulse stretcher. Thus, this circuit can provide an output signal in response to one of its input signals, but not when both are present. The output of the anticoincidence gate 70 is considered a reject signal. It has the wave shape represented by 70A. Thus, should the interface on the top of the contents of a container be detected within the region between acceptable limits, then both inputs to the anticoincidence gate 70 will occur substantially simultaneously, and no output will be obtained from the anticoincidence gate. However, should the fill height of the container be greater or less than the limits established on the opal glass by the opaque regions 18 and 20, the video photocell output will not contain an interface signal within the duration of the limit-gate photocell output, as a result of which the anticoincidence gate will provide an output signal. This output signal is applied to an adder circuit, designated as the reject-signal adder circuit 72.

The cap-detector coil comprises a coil which is in the tank circuit of an oscillator, designated as the cap-proximity oscillator 42. When the metal of the cap is in proximity to the cap-detector coil, the tank circuit losses increase to the point where oscillation of the oscillator is discontinued. Otherwise, the cap-proximity oscillator can oscillate. Thus, should no cap be present on the container, then the cap-proximity oscillator oscillates and provides an output consisting of an oscillation signal represented by the wave shape 42A to a cap detector 44.

The cap detector merely rectifies the oscillations received from the oscillator and applies its output to a cap-detector amplifier 47. The output of the cap detector is represented by the wave shape 44A. The output of the cap-detector amplifier, represented by the wave shape 47A, is considered as a "no-cap" reject signal, and this is added to the output of the anticoincidence gate in the reject-signal adder circuit 72. The output wave shape of the reject-signal adder circuit is represented by the wave shape 72A. It comprises the sum of its two inputs.

The function of the trigger switch 46 is to indicate the interval during which a container may be properly inspected. Thus, the output of the trigger switch 46 consists of a signal or pulse having a duration determined by the time it takes the container to move through the inspection zone. This is established by the star wheel 44, which is actuated by the container as it is moving through the inspection zone. The output of the trigger switch 46, consisting of the pulse 46A, is applied to a trigger-delay circuit 74. The trigger-delay circuit performs the function of delaying the trigger-switch output until all switch contact bounce has subsided. Its output, represented by the wave shape 74A, is applied to a circuit designated as a look-interval generator 76. This comprises circuitry for generating a short, narrow, high-amplitude pulse, represented by the wave shape 76A, which will occur within the interval of the wave shape 74A. This circuitry may comprise the well-known blocking-oscillator circuit, which provides a single output pulse in response to a single input pulse. The output of the look-interval generator 76 is applied to a coincidence gate 78. The coincidence gate also receives the output of the reject-signal adder 72. In the presence of both inputs, a single output signal, represented by the wave shape 78A, is applied to the reject apparatus 80, causing it to operate and withdraw the container which has been inspected and which does not have a cap or which does not fill to the proper level. It should be noted that any of the outputs from either the anticoincidence gate 70 or the cap-detector amplifier 46, plus an output from the look-interval generator 76, are sufficient to actuate the coincidence gate 78.

Accordingly, from the above description, it may be seen that the apparatus, in accordance with this invention, by means of the objective lens 26 and the multisided mirror 28, scans both the region of a container where the interface between the container contents and air should occur, if the container is properly filled, and, also the region of a mask, which establishes the upper and lower fill-height limits. Should the interface signal occur during the time that a limit-gate signal is provided by the means which is scanning the mask, then the container is accepted as having the proper fill height, provided it also is capped. A cap detector also performs the function of determining this while the container is being inspected for fill height. Should an interface signal be obtained when no fill-height limit signal occurs, or should the fill-height limit signal transpire without the occurrence of an interface signal, then the container is rejected as not having the proper fill height.

It will be appreciated that the apparatus described can be easily changed for inspecting different sized containers or different fill-height requirements for containers. This is achieved by changing the fill-height mask markings, or location, as well as by adjusting the position of the housing 24, which contains the objective lens 26 and the multisided mirror 28, and, finally, if required, adjusting the location of the cap-detection coil and the star wheel 144. Any well-known means may be employed to accomplish the requisite positioning or adjusting of the housing, as well as of the multisided mirror and objective lens supported therein. It should be further appreciated that this invention is not and should not be restricted to measuring a container filled with a liquid, as it will operate equally well in detecting the fill-height level or interface in a translucent container of a solid. The interface here is detected by the signal generated when a transition occurs from a light to a dark region. The interface in a liquid is evidenced by the change in signal which always occurs in scanning because the interface region is darker than the liquid, the air, or even foam, where the liquid is beer. It should also be noted that the limit-gate signal need not be generated photoelectrically, but can be generated electrically by any well-known circuit means for generating a pulse signal having a predetermined and variable width which may be properly timed to start from a switch on the shaft which rotates the multisided mirror. The start and end of the pulse signal indicates the beginning and end of the interval, within which an interface signal must be received to render the fill-height acceptable.

There has accordingly been described and shown herein a novel, useful, and thoroughly reliable apparatus for inspecting translucent containers to determine whether or not they have been properly filled and also to determine whether or not they have been capped.

We claim:
1. Apparatus for detecting whether a translucent container has been filled to a proper level comprising means defining an inspection zone through which said container is carried including at one side of said inspection zone means establishing a uniformly illuminated region indicative of a predetermined acceptable fill-height range, a first and second photocell positioned at the other side of said inspection zone, means for repetitively and simultaneously scanning said illuminated region and the region of the container at which an acceptable fill height should occur and for projecting images of these scanned regions respectively on said first and second photocells, means connected to said first photocell for deriving a first signal therefrom having a duration representative of the time during which said illuminated region is scanned, means connected to said second photocell for deriving a second signal therefrom representative of an interface which occurs at the top of the contents with which said container is filled, and means rendered operative when said second signal does not occur within the interval of said first signal to reject said container.

2. A translucent container fill-height inspection apparatus as recited in claim 1 wherein said means for establishing a uniformly illuminated region representative of an acceptable fill-height range comprises an opal glass, means masking off a portion of said opal glass for providing a remaining translucent region which defines predetermined acceptable fill-height limits.

3. Apparatus as recited in claim 1 wherein said means defining an inspection zone includes means responsive to the absence of a metal cap on said container for providing a third signal, and means for actuating said reject apparatus responsive to the presence of said third signal.

4. Apparatus for inspecting a translucent container to determine whether or not it has been filled to a proper level comprising means establishing an inspection zone including illuminating means at one side of said inspection zone and fill-height detecting means on the other side of said inspection zone, said illuminating means including means for illuminating said translucent container and means for establishing an illuminated region representative of the predetermined acceptable fill-height range, said detecting means including means for simultaneously scanning said illuminated region and a predetermined region of said container for providing a first signal representative of the interval required for scanning said illuminated region and a second signal indicative of the occurrence of an interface within the region of said container which is scanned, means responsive to the occurrence of a first signal and not a second signal to provide a reject signal, and reject means operated responsive to said reject signal to reject said containers.

5. Apparatus as recited in claim 4 wherein said fill-height detection apparatus includes an objective lens, a rotatably mounted multisided mirror, a first and second photocell, means for positioning said lens and said multisided mirror for reflecting light rays from said predetermined region of said container and from said illuminated region respectively upon said second and first photocells.

6. Apparatus as recited in claim 5 wherein said inspection zone includes means for detecting the presence of a cap upon said container including an oscillator having coil means in circuit therewith for preventing oscillations of said oscillator in the presence of metal, means mounting said coil means to be proximal to a cap on a container which is passing through said inspection zone, means for generating a second reject signal responsive to output of said oscillation circuit, and means for actauting said reject apparatus responsive to said second reject signal.

7. Apparatus for inspecting a container for the presence of a cap and for fill height comprising an inspection zone having at one side thereof illumination means for said container, fill-height detection means on the other side thereof, and cap-detection means above said inspection zone, said illumination means comprising an opal glass, and masking means for rendering predetermined portions of said opal glass opaque to provide a remaining translucent region representative of an acceptable range of fill heights, said cap-detection means including an oscillator having a frequency-determining coil therein, said coil being positioned in said inspection zone to be proximal to the cap on a container whereby said oscillator is prevented from oscillating in the presence of said cap, and means for generating a first rejection signal from the output of said oscillator responsive to oscillations therefrom, said fill-height detection means including lens means, a rotatably supported multisided mirror, means for rotating said multisided mirror, a first and second photocell, means for positioning said lens means, multisided mirror, and first and second photocells relative to one another for deflecting an image of said illuminated region upon said first photocell and an image of the region of said container within which an acceptable fill height should occur upon said second photocell, means for deriving a first signal from the output of said first photocell representative of the interval required for scanning said illuminated region, means for deriving a second signal from said second photocell indicative of the occurrence of an interface at the top of the contents of said container, means for providing an enabling signal while said container is within said inspection zone, means to which said first and second signals are applied for generating a second reject signal when only one of said first and second signals is applied thereto, means for combining said first and second reject signals to provide a resultant signal, a normally inoperative means for rejecting a container, and means responsive to the simultaneous application of said enabling signal and said resultant signal for rendering said reject apparatus operative.

8. Apparatus as recited in claim 7 wherein said means for producing a first reject signal responsive to the presence of a first signal and not a second signal comprises means to which said first and second signals are applied for producing an accept signal responsive to the simultaneous application of said first and second signals, and means to which said first signal and said accept signal are applied for producing a first reject signal responsive to the occurrence of either one of its inputs but not to both simultaneously.

References Cited in the file of this patent

UNITED STATES PATENTS

| | | |
|---|---|---|
| 1,737,126 | Reyling | Nov. 26, 1929 |
| 1,976,683 | Harding | Oct. 16, 1934 |
| 2,142,920 | Rose | Jan. 3, 1939 |
| 2,635,747 | Hughes | Apr. 21, 1953 |
| 2,769,922 | Peery | Nov. 6, 1956 |
| 2,798,605 | Richards | July 9, 1957 |
| 2,800,226 | Drennan | July 23, 1957 |
| 2,884,783 | Spengler | May 5, 1959 |
| 2,936,886 | Harmon | May 17, 1960 |
| 2,999,589 | Norwich | Sept. 12, 1961 |

FOREIGN PATENTS

| | | |
|---|---|---|
| 842,031 | Great Britain | July 20, 1960 |